US012579359B2

(12) United States Patent
Krishnamoorthy

(10) Patent No.: US 12,579,359 B2
(45) Date of Patent: Mar. 17, 2026

(54) ELECTRONIC DOCUMENT VALIDATION

(71) Applicant: Capital One Services, LLC, McLean, VA (US)

(72) Inventor: Sunilkumar Krishnamoorthy, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 513 days.

(21) Appl. No.: 18/060,149

(22) Filed: Nov. 30, 2022

(65) Prior Publication Data

US 2024/0176951 A1    May 30, 2024

(51) Int. Cl.
| | |
|---|---|
| *G06V 10/24* | (2022.01) |
| *G06F 40/226* | (2020.01) |
| *G06V 10/26* | (2022.01) |
| *G06V 10/762* | (2022.01) |
| *G06V 10/764* | (2022.01) |
| *G06V 30/14* | (2022.01) |
| *G06V 30/146* | (2022.01) |
| *G06V 30/148* | (2022.01) |

(52) U.S. Cl.
CPC ............ *G06F 40/226* (2020.01); *G06V 10/24* (2022.01); *G06V 10/26* (2022.01); *G06V 10/762* (2022.01); *G06V 10/764* (2022.01); *G06V 30/1448* (2022.01); *G06V 30/1465* (2022.01); *G06V 30/15* (2022.01)

(58) Field of Classification Search
CPC ...... G06F 40/226; G06V 10/24; G06V 10/26; G06V 10/762; G06V 10/764; G06V 30/1448; G06V 30/1465; G06V 30/15; G06V 30/10; G06V 30/40; G06V 30/413; G06V 30/414
See application file for complete search history.

(56) References Cited

U.S. PATENT DOCUMENTS

| | | | | |
|---|---|---|---|---|
| 12,061,675 | B1 * | 8/2024 | Bhave .............. | G06F 18/23213 |
| 2021/0124462 | A1 * | 4/2021 | Vakil ..................... | G06F 3/0484 |
| 2021/0124919 | A1 * | 4/2021 | Balakrishnan ....... | B42D 25/309 |
| 2021/0201445 | A1 * | 7/2021 | Kang ........................ | G06T 3/60 |
| 2024/0020328 | A1 * | 1/2024 | Puram ................... | G06F 16/353 |

* cited by examiner

*Primary Examiner* — Han Hoang
(74) *Attorney, Agent, or Firm* — Harrity & Harrity, LLP

(57) ABSTRACT

In some implementations, a device may obtain an electronic document. The device may extract a portion of the electronic document. The device may obtain first text data associated with the portion. The device may determine whether the first text data corresponds to any of a plurality of text indicators of document types. The device may obtain, based on a determination that the first text data does not correspond to any of the plurality of text indicators, second text data associated with a greater portion of the electronic document that includes more than the first text data. The device may determine, using a machine learning model, a type of the electronic document based on the second text data. The device may determine whether the type of the electronic document differs from an expected document. The device may transmit a notification indicating that the electronic document is not the expected document.

20 Claims, 10 Drawing Sheets

130
Perform OCR on an entirety of
the electronic document to
obtain second text data 135
Determine, using a machine
learning model, a type of the
electronic document based on
the second text data 140
Determine whether the type of
the electronic document differs
from the requested document Validation
System

100

Second Text Data
Form No. 987654 2020 Tax
Reporting Statement Account
No. 1234567 Form 1099-DIV 1a
. . . 1b . . . Form 1099-INT 1 . . . .
1b . . . Form 1099-INT 1 . . . .
2 . . .

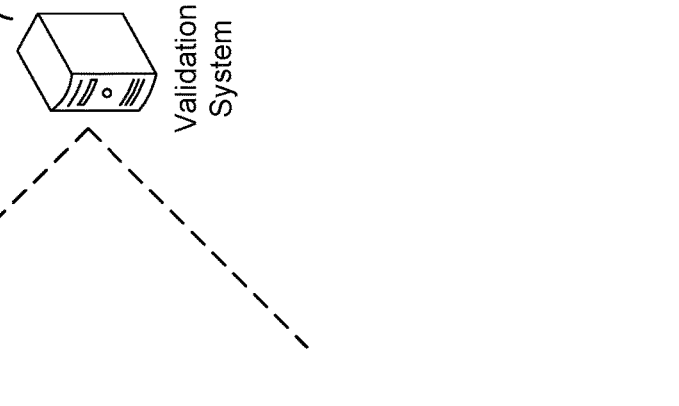

Model

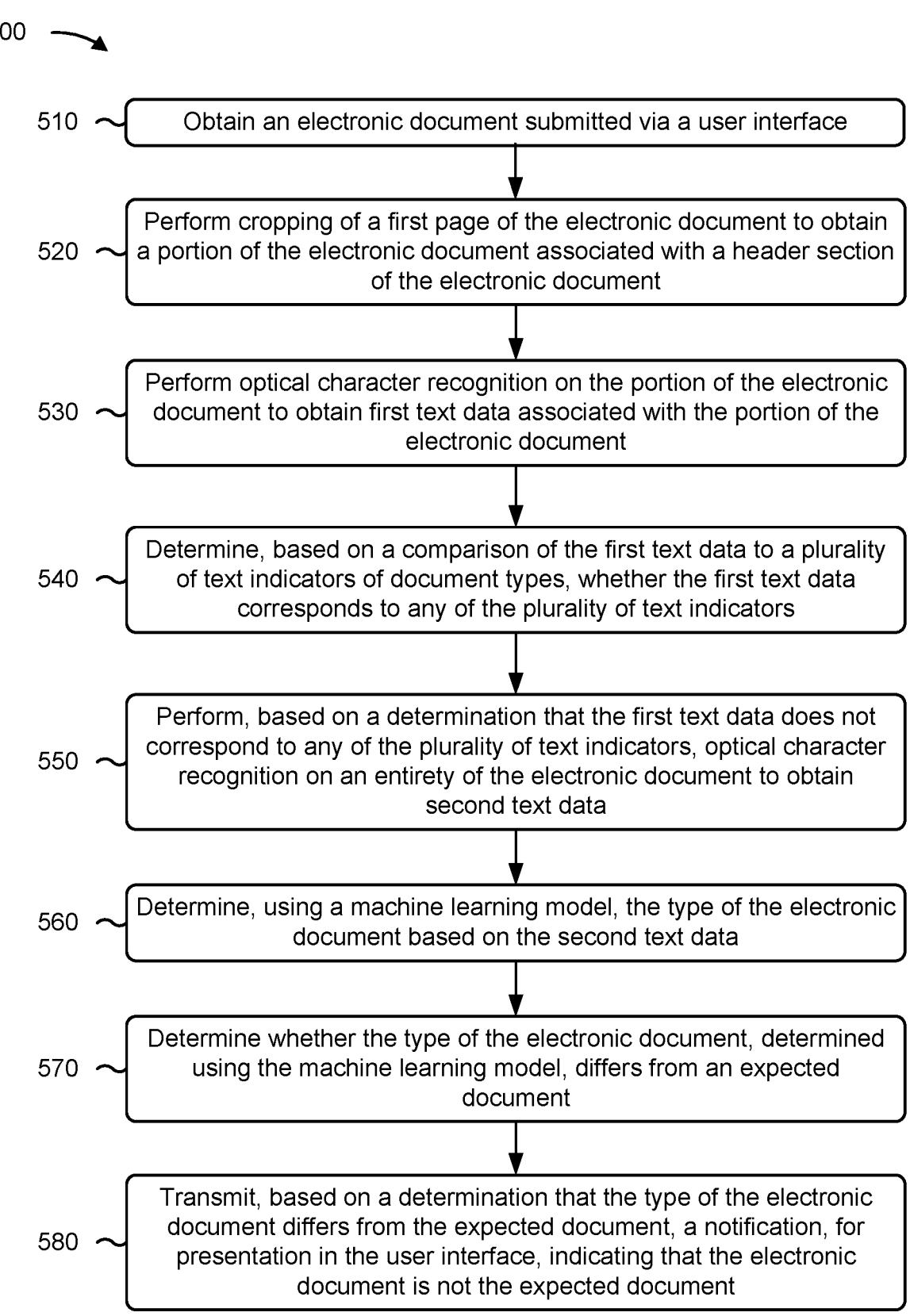

510 — Obtain an electronic document submitted via a user interface

520 — Perform cropping of a first page of the electronic document to obtain a portion of the electronic document associated with a header section of the electronic document 530 — Perform optical character recognition on the portion of the electronic document to obtain first text data associated with the portion of the electronic document 540 — Determine, based on a comparison of the first text data to a plurality of text indicators of document types, whether the first text data corresponds to any of the plurality of text indicators 550 — Perform, based on a determination that the first text data does not correspond to any of the plurality of text indicators, optical character recognition on an entirety of the electronic document to obtain second text data 560 — Determine, using a machine learning model, the type of the electronic document based on the second text data 570 — Determine whether the type of the electronic document, determined using the machine learning model, differs from an expected document 580 — Transmit, based on a determination that the type of the electronic document differs from the expected document, a notification, for presentation in the user interface, indicating that the electronic document is not the expected document

FIG. 5

ELECTRONIC DOCUMENT VALIDATION

BACKGROUND

An electronic document refers to information stored in a file formatted in a manner that requires a computer or other electronic device to display, interpret, and/or otherwise process the information. In some cases, an electronic document may be viewed using a document viewer application that presents the information recorded in the file in a human-readable or printer-friendly form.

SUMMARY

Some implementations described herein relate to a system for electronic document validation. The system may include one or more memories and one or more processors communicatively coupled to the one or more memories. The one or more processors may be configured to obtain an electronic document submitted via a user interface. The one or more processors may be configured to perform cropping of a first page of the electronic document to obtain a portion of the electronic document associated with a header section of the electronic document. The one or more processors may be configured to perform optical character recognition on the portion of the electronic document to obtain first text data associated with the portion of the electronic document. The one or more processors may be configured to determine, based on a comparison of the first text data to a plurality of text indicators of document types, whether the first text data corresponds to any of the plurality of text indicators, where the first text data corresponding to a text indicator of a document type, indicates that a type of the electronic document is the document type. The one or more processors may be configured to perform, based on a determination that the first text data does not correspond to any of the plurality of text indicators, optical character recognition on an entirety of the electronic document to obtain second text data. The one or more processors may be configured to determine, using a machine learning model, the type of the electronic document based on the second text data. The one or more processors may be configured to determine whether the type of the electronic document, determined using the machine learning model, differs from an expected document. The one or more processors may be configured to transmit, based on a determination that the type of the electronic document differs from the expected document, a notification, for presentation in the user interface, indicating that the electronic document is not the expected document.

Some implementations described herein relate to a method of electronic document validation. The method may include obtaining, by a device, an electronic document submitted via a user interface. The method may include extracting, by the device, a portion of the electronic document. The method may include obtaining, by the device, first text data associated with the portion of the electronic document. The method may include determining, by the device, whether the first text data corresponds to any of a plurality of text indicators of document types. The method may include obtaining, by the device and based on a determination that the first text data does not correspond to any of the plurality of text indicators, second text data associated with a greater portion of the electronic document that includes more than the first text data. The method may include determining, by the device and using a machine learning model, a type of the electronic document based on the second text data. The method may include determining, by the device, whether the type of the electronic document, determined using the machine learning model, differs from an expected document. The method may include transmitting, by the device and based on a determination that the type of the electronic document differs from the expected document, a notification, for presentation in the user interface, indicating that the electronic document is not the expected document.

Some implementations described herein relate to a non-transitory computer-readable medium that stores a set of instructions for electronic document validation for a device. The set of instructions, when executed by one or more processors of the device, may cause the device to obtain an electronic document submitted via a user interface. The set of instructions, when executed by one or more processors of the device, may cause the device to extract a portion of the electronic document. The set of instructions, when executed by one or more processors of the device, may cause the device to obtain text data associated with the portion of the electronic document. The set of instructions, when executed by one or more processors of the device, may cause the device to determine that the text data corresponds to a text indicator of a plurality of text indicators of document types, where the text data corresponding to the text indicator of a document type indicates that a type of the electronic document is the document type. The set of instructions, when executed by one or more processors of the device, may cause the device to transmit, based on a determination that the type of the electronic document differs from an expected document, a notification, for presentation in the user interface, indicating that the electronic document is not the expected document.

BRIEF DESCRIPTION OF THE DRAWINGS

FIGS. 1A-1F are diagrams of an example associated with electronic document validation, in accordance with some embodiments of the present disclosure.

FIG. 5 is a flowchart of an example process associated with electronic document validation, in accordance with some embodiments of the present disclosure.

DETAILED DESCRIPTION

Figure 1A:
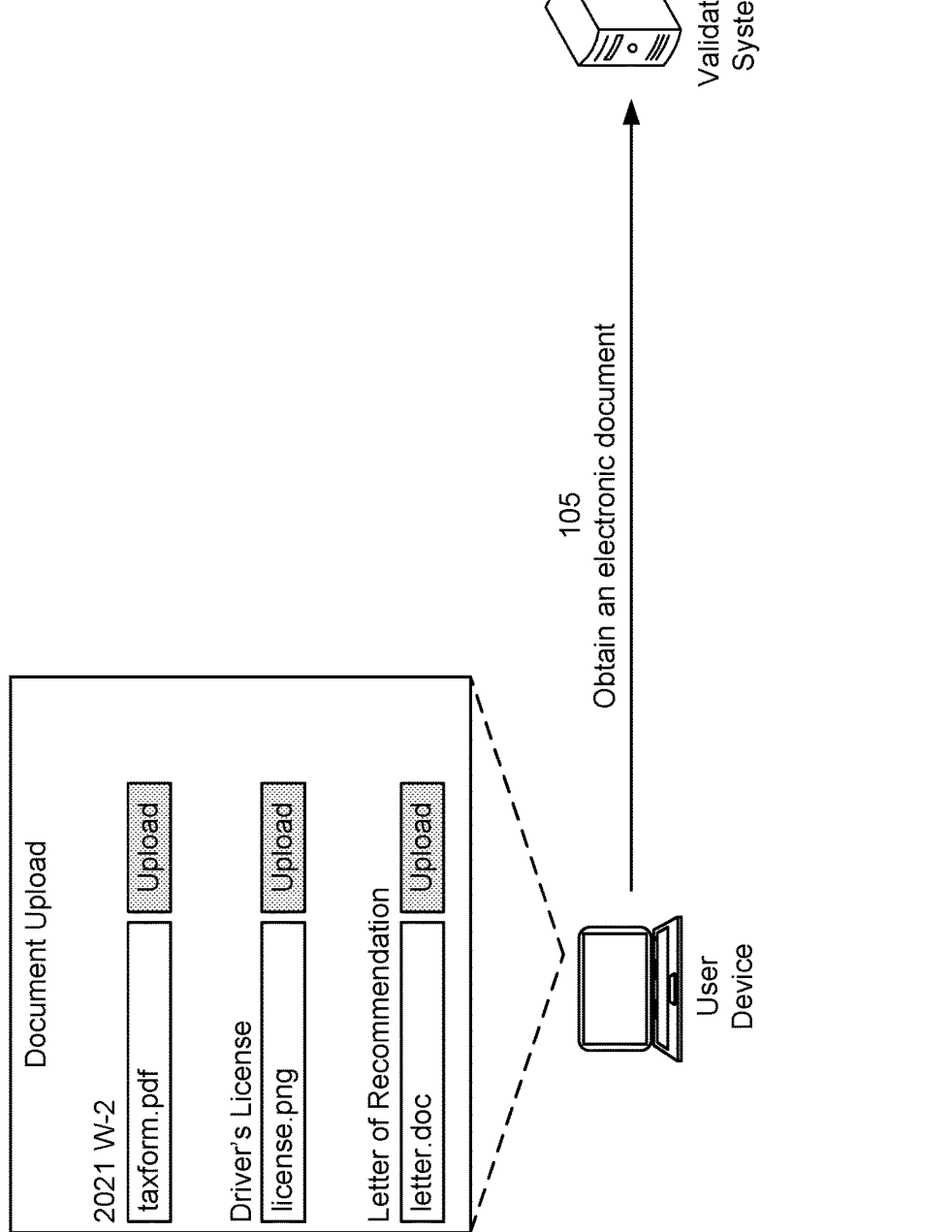

The following detailed description of example implementations refers to the accompanying drawings. The same reference numbers in different drawings may identify the same or similar elements.

Implementations described herein provide efficient electronic document validation that may occur in real time or near-real time while a user is actively engaged in document submission, thereby providing efficient usage of computing resources (e.g., processor resources, memory resources, or the like) associated with processing, transmitting, and/or storing submitted electronic documents. For example, an entity may request one or more electronic documents from a user. In some cases, the user may provide the electronic documents via a user interface (e.g., an upload portal) that is implemented by a system of the entity. Electronic documents submitted via the user interface may be accepted by the system without validation as to whether the electronic documents correspond to the expected documents. The unvalidated electronic documents may undergo various processing, such as image processing to remove noise from the documents, optical character recognition (OCR) and/or natural language processing (NLP) to extract text from the documents, and/or the unvalidated electronic documents may be transmitted to one or more devices or systems for further processing, review, or storage. This may expend significant computing resources (e.g., processor resources, memory resources, storage resources, or the like) and/or network resources. Thereafter, it may be discovered (e.g., by manual review of the electronic documents) that the electronic documents are not the documents that were requested, and thus the computing resources and/or network resources that were expended may be wasted on the incorrect documents.

Some implementations described herein provide document validation in real time or near-real time. For example, the document validation may occur while a user is active in a user interface used for document submission. In some implementations, the document validation may employ a first-pass validation procedure and a second-pass validation procedure if the first-pass validation procedure is unsuccessful. In the first-pass validation procedure, a portion of a first page (e.g., a header section of the first page) of an electronic document, that is submitted via a user interface, may be captured, and OCR may be performed on the portion to obtain first text data. The first text data may be compared to text known to be associated with various document types to determine a document type of the electronic document. Use of the portion of the electronic document facilitates fast and efficient document validation. Moreover, the user may be notified, via the user interface and while the user is active in the user interface, if an incorrect document was submitted, thereby facilitating correction before computing resources and/or network resources are expended to process, transmit, and/or store the incorrect document.

In the second-pass validation procedure, if the first-pass validation procedure cannot validate the electronic document, OCR may be performed on an entirety of the electronic document to obtain second text data. The second text data may be used as an input to a machine learning model trained to determine a document type of a given electronic document. Thus, the output of the machine learning model may be used to validate the electronic document. In some implementations, user activity in the user interface may be monitored for the duration of the second-pass validation procedure to determine whether the user has remained active in the user interface. Based on determining that the user is active, the user may be notified, via the user interface, if an incorrect document was submitted, thereby facilitating correction before computing resources and/or network resources are expended to process, transmit, and/or store the incorrect document.

FIGS. 1A-1F are diagrams of an example 100 associated with electronic document validation. As shown in FIGS. 1A-1F, example 100 includes a validation system and a user device. These devices are described in more detail in connection with FIGS. 3 and 4.

The validation system may be associated with an entity that has received an application for services from a user associated with the user device. For example, the entity may be a financial institution, and the application for services may be a loan application, a mortgage application, a credit card application, or the like. As another example, the entity may be a car dealership, and the application for services may be a lease application, a financing application, or the like. In connection with the application for services, the user may be requested to provide one or more documents to the entity to facilitate the entity's review of the application for services. In some implementations, the validation system may provide a user interface, for presentation on the user device, in which the user may upload one or more electronic documents to the validation system.

As shown in FIG. 1A, and by reference number 105, the validation system may obtain an electronic document submitted (e.g., by the user using the user device) via the user interface. The electronic document may be submitted responsive to a request for one or more documents and/or pursuant to a periodic document submission (e.g., in connection with an application for services and/or in connection with maintenance of a service). For example, after applying for the services, the user may receive, from the entity, a request for one or more documents, and the user may provide the documents to the entity via the user interface. As another example, in the course of the entity providing services to the user, the user may be expected to periodically provide one or more documents to the entity via the user interface. A document that is supposed to be provided by the user responsive to a document request or pursuant to a periodic document submission may be referred to herein as an expected document. In some implementations, the electronic document may include a single page or multiple pages. In some implementations, the electronic document may be an image file, a word processing file, a spreadsheet file, or the like. In some implementations, the electronic document may be associated with a driver's license, a photo identification card, a social security card, a passport, a tax form, a bank statement, a credit card statement, a utility bill, a pay stub, a letter of recommendation, a letter of good standing, or the like. In some implementations, the validation system may obtain a plurality of electronic documents, that include the electronic document, submitted (e.g., by the user using the user device) via the user interface.

In some implementations, the validation system may convert the electronic document to an image file. For example, if the electronic document obtained by the validation system (e.g., as submitted by the user device) is not an image file, the validation system may convert the electronic document to an image file. This may facilitate image processing techniques to be performed on the electronic document, as described herein. In some implementations, the validation system may convert only a first page (e.g., a first substantive page, such as a first non-blank page or a first non-coversheet page), of a multiple-page electronic document, to the image file, thereby conserving computing resources (e.g., processor resources, memory resources, or the like) that would have otherwise been used to convert the entire multiple-page electronic document into the image file. Conversion of the electronic document (e.g., of the first page thereof) to an image file may result in the creation of a new electronic document. References to "the electronic document" in the description to follow are applicable to the electronic document obtained by the validation system via the user interface, or to the new converted electronic document.

Figure 1B:
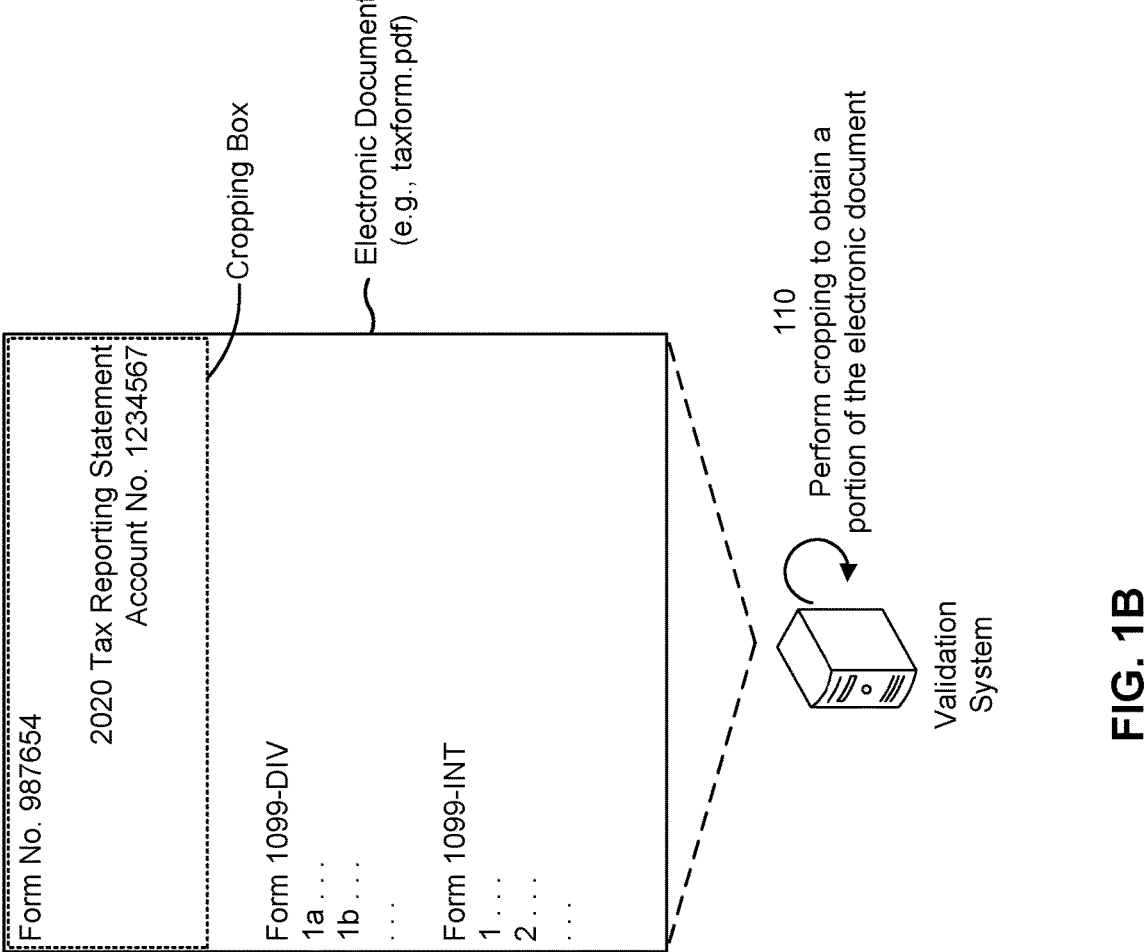

As shown in FIG. 1B, and by reference number 110, in connection with a first-pass validation procedure, the validation system may perform cropping of the electronic document to extract a portion of the electronic document (e.g., that is less than an entirety of the electronic document). For example, the validation system may perform cropping of a first page of the electronic document to extract the portion of the electronic document. The first page may be a first substantive page of the electronic document, as described above. In some implementations, the validation system may determine that the first substantive page of the electronic document is a page that includes less than a threshold proportion of a background color, such as white (e.g., by comparing a quantity of white or near-white pixels of an image to a total quantity of pixels of the image), a page that includes at least a threshold word count, or the like. The cropping may be performed on the image file of the electronic document (e.g., the electronic document may be converted to an image file prior to the cropping). The portion of the electronic document may be used for performing document validation, as described herein, thereby facilitating fast and efficient document validation and conserving computing resources (e.g., processor resources, memory resources, or the like) that may have otherwise been used to perform document validation using the entire electronic document.

The portion of the electronic document may be a header section of the electronic document (e.g., of the first page thereof). The header section may be an upper portion of the electronic document (e.g., of the first page thereof). The header section may be a portion of the electronic document located spatially above a main content area of the electronic document. The header section may be based on a fractional percentage of the electronic document's dimensions. For example, the header section may be an upper half, an upper third, an upper quarter, an upper fifth, or the like, of the electronic document (e.g., of the first page thereof). The header section may include information such as a title of the electronic document, an author of the electronic document, a form identifier for the electronic document, a control number associated with the electronic document, and/or a year or a date associated with the electronic document, among other examples.

In some implementations, the portion of the electronic document may be other than an upper or header section of the electronic document (e.g., the portion of the electronic document may be located outside of an upper or header section of the electronic document). In some implementations, the portion of the electronic document may additionally or alternatively include a footer section of the electronic document, a border section of the electronic document, a margin section of the electronic document, and/or a background of the electronic document, among other examples. The footer section may be a portion of the electronic document located spatially below a main content area of the electronic document. The footer section may be based on a fractional percentage of the electronic document's dimensions. For example, the footer section may be a lower half, a lower third, a lower quarter, or a lower fifth, or the like, of the electronic document (e.g., of the first page thereof). The margin section of the electronic document may be a portion of the electronic document located spatially to the left and/or to the right of a main content area of the electronic document. The border section of the electronic document may be a portion of the electronic document that surrounds a main content area of the electronic document. The background of the electronic document may spatially share a location with a main content area of the electronic document. For example, the main content area may be in a foreground of the electronic document. The background of the electronic document may include a watermark, such a textual watermark and/or an image watermark.

In some implementations, to perform cropping of the electronic document (e.g., of the first page thereof), the validation system may identify a height and a width of the electronic document (e.g., of the first page thereof). Based on the height and the width (e.g., in pixels), the validation system may determine a height and a width (e.g., in pixels) of a cropping box that is to be used for cropping the electronic document. The height of the cropping box may be less than the height of the electronic document (e.g., of the first page thereof). For example, the height of the cropping box may be no more than 50%, 34%, 25%, 20%, or the like, of the height of the electronic document (e.g., of the first page thereof). The width of the cropping box may be the same as the width of the electronic document (e.g., of the first page thereof). The validation system may perform cropping of the electronic document (e.g., of the first page thereof) in accordance with the cropping box (e.g., to a size of the cropping box), for example, based on a top of the cropping box aligning with a top of the electronic document (e.g., of the first page thereof).

Additionally, or alternatively, the validation system may perform color filtering on the electronic document to extract the portion of the electronic document. For example, to extract the header section of the electronic document, the validation system may perform color filtering according to one or more colors associated with a main content of the electronic document (e.g., to remove the main content and leave the header section). As an example, if the header section uses blue text and the main content uses black text, then the color filtering may be on black color to remove the main content from the electronic document. As another example, if user-specific content of the electronic document uses black text and a remainder of the electronic document uses non-black color, then the color filtering may be on a black color to remove the user-specific content from the electronic document.

Figure 1C:
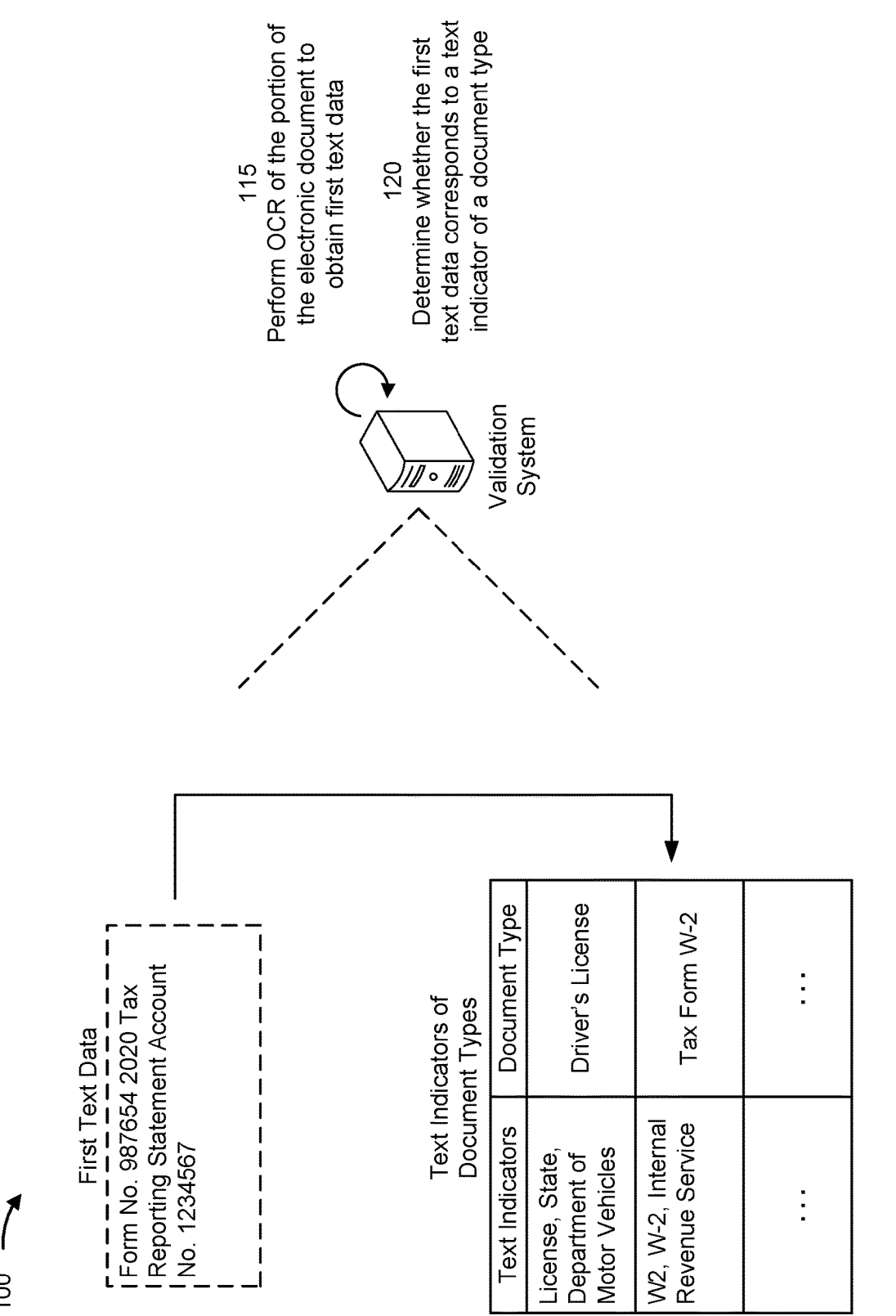

As shown in FIG. 1C, and by reference number 115, in connection with the first-pass validation procedure, the validation system may perform optical character recognition (OCR) on the portion of the electronic document to obtain first text data. That is, the first text data may be associated with the portion of the electronic document. In some implementations, the validation system may perform natural language processing (NLP), such as semantic analysis, on the first text data to identify an accuracy level of the OCR. The validation system may accept the first text data based on the accuracy level satisfying a threshold. The validation system may reject the first text data based on the accuracy level not satisfying the threshold. If the first text data is rejected, then the validation system may perform one or more image processing techniques on the portion of the electronic document (e.g., to remove noise, to remove lines, to increase contrast, or the like), and the validation system may perform OCR on the processed portion of the electronic document to obtain the first text data. Alternatively, or if the first text data obtained from the processed portion of the electronic document is again rejected, the validation system may proceed with attempting validation of the electronic document using a second-pass validation procedure, as described below.

As shown by reference number 120, in connection with the first-pass validation procedure, the validation system may determine whether the first text data (e.g., all of the first text data or a portion thereof) corresponds to any of a plurality of text indicators of document types (e.g., based on accepting the first text data). For example, the validation system may compare the first text data to the text indicators of document types to determine whether the first text data corresponds to any of the text indicators of document types. Comparison of the first text data to the text indicators of document type may use string matching, approximate string matching, regular expressions, or the like. A text indicator may be text that is associated with a document type. For example, a text indicator may include one or more words, one or more characters, and/or one or more numbers that are indicative of a document type (e.g., alone, or in combination with one or more additional text indicators). For example, text indicators of a driver's license document type may include "license," "state," and/or "department of motor vehicles."

In some implementations, the validation system may determine that the first text data corresponds to (e.g., matches or has a threshold level of similarity to) one or more text indicators of a document type. The first text data corresponding to the one or more text indicators may indicate that a type of the electronic document is the document type associated with the one or more text indicators. Based on determining that the type of the electronic document is the document type, the validation system may determine whether the type of the electronic document differs from the expected document (e.g., a requested document or a periodically-submitted document). For example, if the expected document is a W-2 form, and the type of the electronic document is a paystub, then the validation system may determine that the type of the electronic document differs from the expected document. Otherwise, the validation system may determine that the type of the electronic document is (e.g., corresponds to) the expected document, thereby providing fast and efficient validation of the electronic document (e.g., in real time).

Additionally, or alternatively, the validation system may perform image analysis on the portion of the electronic document to determine a type of the electronic document. For example, the validation system may extract one or more images (e.g., photographs, graphical designs, or the like) from the portion of the electronic document, and the validation system may perform image analysis (e.g., a computer vision technique) to determine whether the images correspond to one or more image indicators of a document type. As an example, an image indicator of a photo identification card may be an image that depicts a human face. In some implementations, the validation system may determine that the images extracted from the portion of the electronic document correspond to (e.g., match or have a threshold level of similarity to) one or more image indicators of a document type. The images corresponding to the one or more image indicators may indicate that a type of the electronic document is the document type associated with the one or more image indicators. Based on determining that the type of the electronic document is the document type, the validation system may determine whether the type of the electronic document differs from the expected document, in a similar manner as described above.

Additionally, or alternatively, the validation system may use template matching on the portion of the electronic document to determine a type of the electronic document. For example, the validation system may compare the portion of the electronic document to one or more templates associated with document types. For example, a template may be associated with a driver's license for a particular state, a particular tax form, or the like. In some implementations, the validation system may determine that the portion of the electronic document corresponds to (e.g., has a threshold level of similarity to) a template associated with a document type. The portion of the electronic document corresponding to the template may indicate that a type of the electronic document is the document type associated with the template. Based on determining that the type of the electronic document is the document type, the validation system may determine whether the type of the electronic document differs from the expected document, in a similar manner as described above.

In some implementations, based on a determination that the type of the electronic document is the expected document, the validation system may determine whether an attribute of the electronic document differs from the expected document. The validation system may determine whether the attribute of the electronic document differs from the expected document based on the first text data. The attribute may be a particular time period (e.g., a particular year, month, or date) associated with the electronic document, a particular author or issuer of the electronic document, a particular account or account type associated with the electronic document, or the like. For example, the expected document may be a W-2 form for 2021 (where 2021 is the attribute), a paystub for September (where September is the attribute), a bank statement for a checking account (where checking account is the attribute), or the like.

To determine whether the attribute of the electronic document differs from the expected document, the validation system may determine (e.g., using NLP, such as semantic analysis) whether the first text data indicates an attribute. For example, the validation system may determine whether the first text data includes text indicating a year (e.g., if the attribute is a year), text indicating an account type (e.g., if the attribute is an account type), or the like. Based on a determination that the first text data indicates an attribute, the validation system may determine whether the attribute differs from the expected document. For example, if the expected document is a paystub for September, and the attribute identified in the first text data is "February," then the validation system may determine that the attribute of the electronic document differs from the expected document.

Figure 1D:
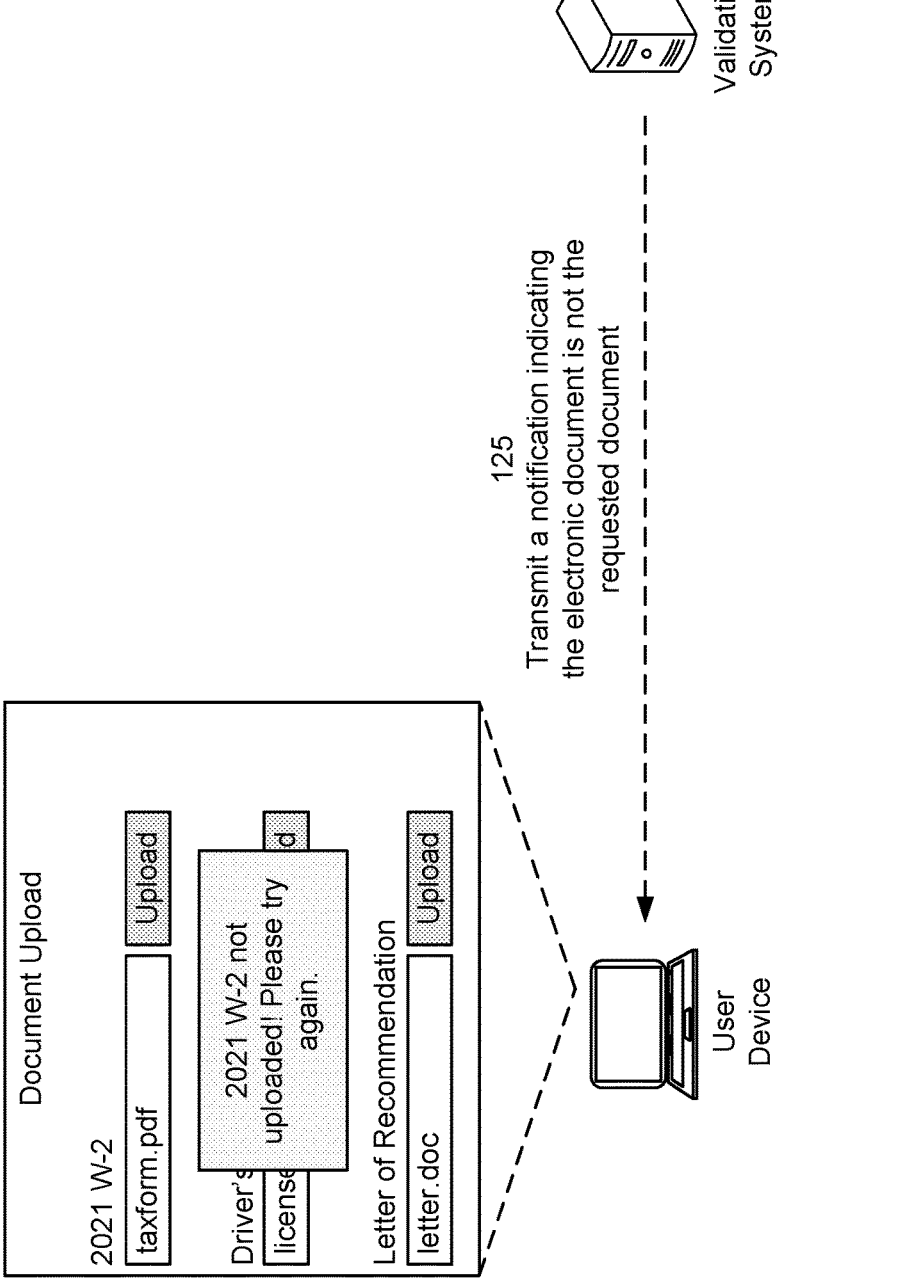

As shown in FIG. 1D, and by reference number 125, in connection with the first-pass validation procedure, based on a determination that the type of the electronic document differs from the expected document, the validation system may transmit a notification, for presentation in the user interface, indicating that the electronic document that was submitted is not the expected document. In some implementations, based on a determination that the type of the electronic document corresponds to the expected document, and a determination that the attribute of the electronic document differs from the expected document, the validation system may transmit the notification, for presentation in the user interface, indicating that the electronic document that was submitted is not the expected document. The notification may further request the user to re-attempt submitting the expected document and/or the notification may provide an input element for the user to re-attempt submitting the expected document. Thus, the validation system may provide fast and efficient validation of the electronic document (e.g., in real time or near-real time). Accordingly, the user may immediately correct the error while still actively engaged in the user interface. In this way, the validation system may conserve significant computing resources (e.g., processor resources, memory resources, network resources, or the like) that may have otherwise been used to process an incorrect document, transmit an incorrect document to one or more additional systems or storage locations, store an incorrect document, contact the user to access the user interface to correct the error, or the like.

In some implementations, the validation system may determine that the first text data does not correspond to (e.g., does not match or have a threshold level of similarity to) any of the text indicators of document types. Additionally, or alternatively, the validation system may determine that the images extracted from the portion of the electronic document do not correspond to any of the image indicators of document types. Additionally, or alternatively, the validation system may determine that the portion of the electronic document does not correspond to any templates associated with document types. That is, the validation system may be unable to validate the electronic document using the first-pass validation procedure. Based on the first-pass validation procedure failing (e.g., based on a determination that the first text data does not correspond to any of the plurality of text indicators), the validation system may begin to monitor user activity in the user interface. For example, the user activity may include interacting with a user interface element or an input element of the user interface, scrolling a view of the user interface, or moving a cursor in the user interface, among other examples.

As shown in FIG. 1E, and by reference number 130, in connection with a second-pass validation procedure, based on a determination that the first text data does not correspond to any of the plurality of text indicators (and/or a determination that images extracted from the portion of the electronic document do not correspond to any of the image indicators of document types and/or a determination that the portion of the electronic document does not correspond to any templates associated with document types), the validation system may perform OCR on a greater portion of the electronic document than the portion of the first-pass validation procedure to obtain second text data. For example, the second text data, associated with the greater portion of the electronic document, may include more than the first text data. In some implementations, in connection with the second-pass validation procedure, the validation system may perform OCR on an entirety of the electronic document to obtain the second text data. As an example, the second text data may be associated with the greater portion of the electronic document or the entirety of the electronic document. The entirety of the electronic document (e.g., on which OCR may be performed) may refer to an entire textual content of the electronic document (e.g., excluding blank pages of the document and/or images of the document). In some implementations, the validation system may perform NLP, such as semantic analysis, on the second text data to identify an accuracy level of the OCR, and the validation system may accept or reject the second text data in a similar manner as described above. If the second text data is rejected, then the validation system may perform one or more image processing techniques on the electronic document (e.g., to remove noise, to remove lines, to increase contrast, or the like), and the validation system may perform OCR on the processed electronic document to obtain the second text data.

As shown by reference number 135, in connection with the second pass validation procedure, the validation system may use a machine learning model to determine a type of the electronic document based on the second text data. In some implementations, the machine learning model may be configured to determine a type of a given electronic document using NLP. In some implementations, the machine learning model may be configured to classify a given electronic document. That is, the machine learning model may be configured to determine a document type classification of a given electronic document, and the document type classification may indicate a type of the electronic document. In some implementations, the machine learning model may be configured to determine (e.g., prior to machine learning classification) a cluster of a given electronic document, and the cluster may indicate a type (e.g., a specific type or a general type) of the electronic document.

In some implementations, where the validation system has obtained a plurality of electronic documents, the validation system may determine, using the machine learning model, one or more clusters to which the plurality of electronic documents belong (e.g., prior to machine learning classification). For example, a first cluster may be associated with paystubs, a second cluster may be associated with tax forms, and so forth. The validation system may select one electronic document from a cluster, such as a cluster that includes the electronic document. The validation system may determine, using an additional machine learning model, a document type classification of the one electronic document (e.g., the electronic document or another electronic document) in the cluster with the electronic document. The document type classification of this one electronic document may indicate the document type classification of all of the electronic documents in the cluster. Accordingly, the type of the electronic document may correspond to the document type classification of the one electronic document of the cluster. In this way, the validation system may efficiently determine document types for a plurality of documents in batches, thereby conserving computing resources (e.g., processor resources, memory resources, or the like) that may have otherwise been used to determine document types for a plurality of documents individually.

Additionally, or alternatively, the validation system may perform image analysis, in a similar manner as described above, on an entirety of the electronic document to determine the type of the electronic document. Additionally, or alternatively, the validation system may perform template matching, in a similar manner as described above, on an entirety of the electronic document to determine the type of the electronic document.

As shown by reference number 140, in connection with the second-pass validation procedure, the validation system may determine whether the type of the electronic document (e.g., determined using the machine learning model) differs from the expected document, in a similar manner as described above. The validation system may determine that the type of the electronic document is (e.g., corresponds to) the expected document, thereby providing fast and efficient validation of the electronic document (e.g., in real time). Alternatively, the validation system may determine that the type of the electronic document differs from the expected document.

In some implementations, based on a determination that the type of the electronic document is the expected document, the validation system may determine whether an attribute of the electronic document differs from the expected document, in a similar manner as described above. For example, the validation system may determine whether the attribute of the electronic document differs from the expected document based on the second text data. Additionally, or alternatively, the validation system may use the machine learning model to identify an attribute of the electronic document, and the validation system may use the attribute determined by the machine learning model to determine whether the attribute differs from the expected document. For example, the machine learning model may be configured to determine a document type classification of a given electronic document, as described above, and the document type classification may indicate a type of the electronic document and an attribute of the electronic document (e.g., "September pay stub," "2021 W-2 form," or the like).

Figure 1F:
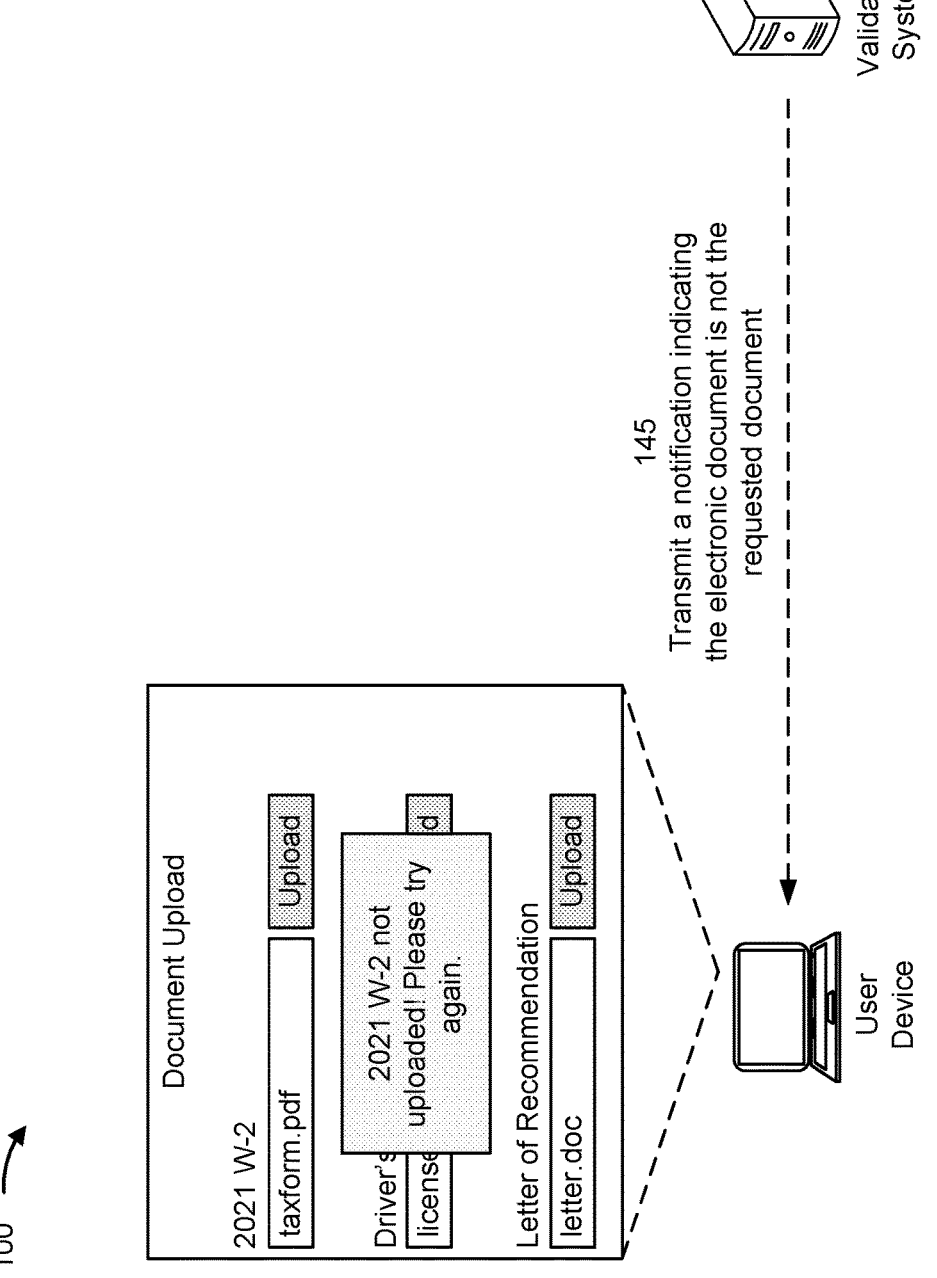

As shown in FIG. 1F, and by reference number 145, in connection with the second-pass validation procedure, based on a determination that the type of the electronic document differs from the expected document, the validation system may transmit a notification, for presentation in the user interface, indicating that the electronic document that was submitted is not the expected document, in a similar manner as described above. In some implementations, based on a determination that the type of the electronic document corresponds to the expected document, and a determination that the attribute of the electronic document differs from the expected document, the validation system may transmit the notification, for presentation in the user interface, indicating that the electronic document that was submitted is not the expected document. In some implementations, based on monitoring the user activity, the validation system may determine that the user is active in the user interface (e.g., because user activity was detected within a particular previous time window). In some implementations, the validation system may transmit the notification based on a determination that the user is active in the user interface. Accordingly, the notification may reach the user while the user is still actively engaged with the user interface and the user may immediately correct the error. In this way, the validation system may conserve significant computing resources (e.g., processor resources, memory resources, or the like) that may have otherwise been used to process an incorrect document, transmit an incorrect document to one or more additional systems or storage locations, store an incorrect document, or the like.

In some implementations, based on a determination that the type of the electronic document differs from the expected document (e.g., in connection with the first-pass validation procedure and/or the second-pass validation procedure), the validation system may obtain, from a storage device, a sample document of the expected document and provide the sample document to the user device for presentation in the user interface (e.g., to help the user identify the correct document). Additionally, or alternatively, based on a determination that the type of the electronic document differs from the expected document (e.g., in connection with the first-pass validation procedure and/or the second-pass validation procedure), the validation system may cause a call (e.g., a video call or a voice call) to be placed from a device of a service representative to the user device (or another device at which the user can be reached), which may enable the service representative to help the user to identify and provide the correct document.

Additionally, or alternatively, based on a determination that the type of the electronic document differs from the expected document (e.g., in connection with the first-pass validation procedure and/or the second-pass validation procedure), the validation system may cause initiation of a text chat session between a device of a service representative and the user device (or another device at which the user can be reached), which may enable the service representative to help the user to identify and provide the correct document. Additionally, or alternatively, based on a determination that the type of the electronic document differs from the expected document (e.g., in connection with the first-pass validation procedure and/or the second-pass validation procedure), the validation system may generate a link configured to establish a call or a chat session and may provide the link to the user device for presentation in the user interface.

As indicated above, FIGS. 1A-1F are provided as an example. Other examples may differ from what is described with regard to FIGS. 1A-1F.

Figure 2:
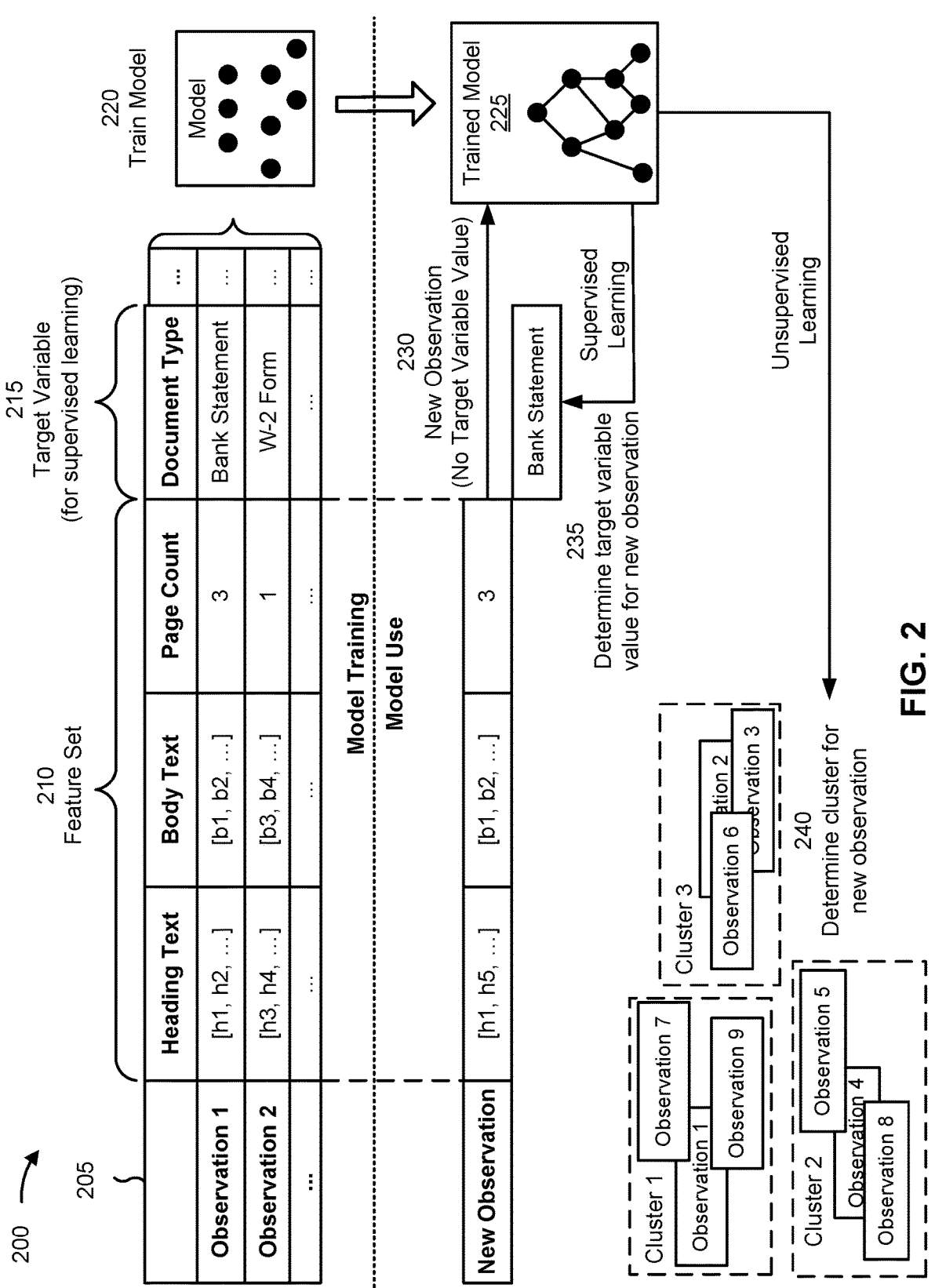
FIG. 2 is a diagram illustrating an example of training and using a machine learning model in connection with electronic document validation, in accordance with some embodiments of the present disclosure.

FIG. 2 is a diagram illustrating an example 200 of training and using a machine learning model in connection with electronic document validation. The machine learning model training and usage described herein may be performed using a machine learning system. The machine learning system may include or may be included in a computing device, a server, a cloud computing environment, or the like, such as the validation system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the validation system, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the validation system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of heading text, a second feature of body text, a third feature of page count, and so on. As shown, for a first observation, the first feature may have a value of h1, h2, and so forth (where h1 and h2 represent words), the second feature may have a value of b1, b2, and so forth (where b1 and b2 represent words), the third feature may have a value of three, and so on. These features and feature values are provided as examples, and may differ in other examples. For example, the feature set may include one or more of the following features: heading text, body text, footer text, page count, word count, page orientation (e.g., portrait or landscape), font size of heading text, font size of body text, presence of horizontal lines, presence of vertical lines, quantity of horizontal lines, quantity of vertical lines, and/or presence of an image, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is document type, which has a value of bank statement for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, using a neural network algorithm, the machine learning system may train a machine learning model to output (e.g., at an output layer) an indication of a document type of an electronic document based on an input (e.g., at an input layer) indicating characteristics relating to the electronic document, as described elsewhere herein. In particular, the machine learning system, using the neural network algorithm, may train the machine learning model, using the set of observations from the training data, to derive weights for one or more nodes in the input layer, in the output layer, and/or in one or more hidden layers (e.g., between the input layer and the output layer). Nodes in the input layer may represent features of a feature set of the machine learning model, such as a first node representing heading text, a second node representing body text, a third node representing page count, and so forth. One or more nodes in the output layer may represent output(s) of the machine learning model, such as a node indicating a document type. The weights learned by the machine learning model facilitate transformation of the input of the machine learning model to the output of the machine learning model. After training, the machine learning system may store the machine learning model as a trained machine learning model 225 to be used to analyze new observations.

As an example, the machine learning system may obtain training data for the set of observations based on electronic documents labeled as to document type. For example, a set of electronic documents may be manually labeled as to document type. Images of the labeled electronic documents and/or text extracted from the labeled electronic documents may be used to train the machine learning system.

As shown by reference number 230, the machine learning system may apply the trained machine learning model 225 to a new observation, such as by receiving a new observation and inputting the new observation to the trained machine learning model 225. As shown, the new observation may include a first feature value of h1, h5, and so forth (where h1 and h5 represent words), a second feature value of b1, b2, and so forth (where b1 and b2 represent words), a third feature value of three, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of bank statement for the target variable of document type for the new observation, as shown by reference number 235. Based on this prediction, the machine learning system may provide a recommendation, may provide output for determination of a recommendation, may perform an automated action, and/or may cause an automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, the machine learning system may classify the new observation in a first cluster (e.g., pay stubs), a second cluster (e.g., bank statements), and so forth. The machine learning system may provide a recommendation, perform an automated action, and/or may cause an automated action to be performed (e.g., by instructing another device to perform the automated action) based on classifying the new observation in a particular cluster.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include document type classifications determined by the trained machine learning model 225.

In this way, the machine learning system may apply a rigorous and automated process to validate electronic documents. The machine learning system may enable recognition and/or identification of tens, hundreds, thousands, or millions of features and/or feature values for tens, hundreds, thousands, or millions of observations, thereby increasing accuracy and consistency and reducing delay associated with electronic document validation relative to requiring computing resources to be allocated for tens, hundreds, or thousands of operators to manually validate electronic documents using the features or feature values.

As indicated above, FIG. 2 is provided as an example. Other examples may differ from what is described in connection with FIG. 2.

Figure 3:
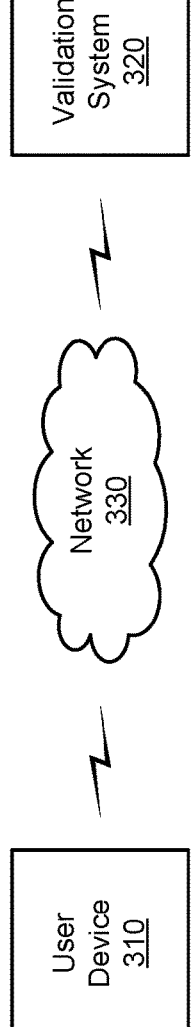
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a user device 310, a validation system 320, and a network 330. Devices of environment 300 may interconnect via wired connections, wireless connections, or a combination of wired and wireless connections.

The user device 310 may include one or more devices capable of receiving, generating, storing, processing, and/or providing information associated with electronic document validation, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The validation system 320 may include one or more devices capable of receiving, generating, storing, processing, providing, and/or routing information associated with electronic document validation, as described elsewhere herein. The validation system 320 may include a communication device and/or a computing device. For example, the validation system 320 may include a server, such as an application server, a client server, a web server, a database server, a host server, a proxy server, a virtual server (e.g., executing on computing hardware), or a server in a cloud computing system. In some implementations, the validation system 320 may include computing hardware used in a cloud computing environment.

The network 330 may include one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
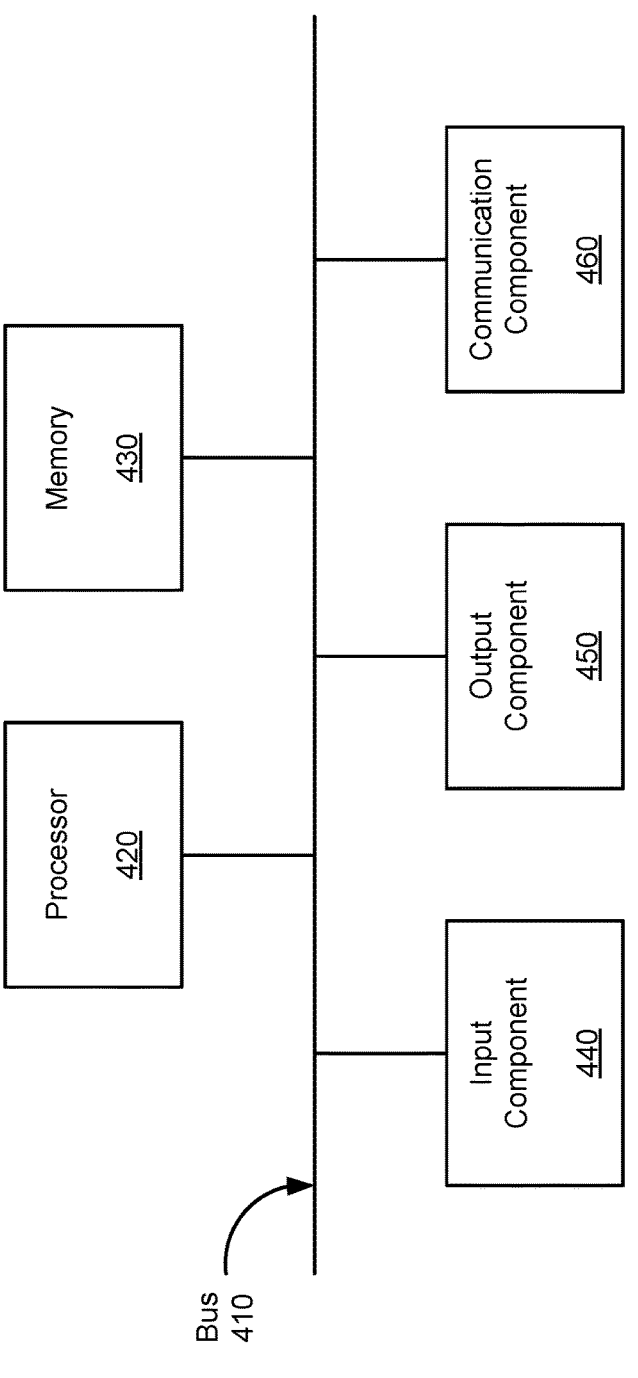
FIG. 4 is a diagram of example components of a device associated with electronic document validation, in accordance with some embodiments of the present disclosure.

FIG. 4 is a diagram of example components of a device 400 associated with electronic document validation. The device 400 may correspond to user device 310 and/or validation system 320. In some implementations, user device 310 and/or validation system 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with electronic document validation. In some implementations, one or more process blocks of FIG. 5 may be performed by the validation system 320. In some implementations, one or more process blocks of FIG. 5 may be performed by another device or a group of devices separate from or including the validation system 320, such as the user device 310. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining an electronic document submitted via a user interface (block 510). For example, the validation system 320 (e.g., using processor 420, memory 430, input component 440, and/or communication component 460) may obtain an electronic document submitted via a user interface, as described above in connection with reference number 105 of FIG. 1A. As an example, the electronic document may be submitted by a user responsive to a document request (e.g., a request for a pay stub) in connection with an application for services made by the user.

As further shown in FIG. 5, process 500 may include performing cropping of a first page of the electronic document to obtain a portion of the electronic document associated with a header section of the electronic document (block 520). For example, the validation system 320 (e.g., using processor 420 and/or memory 430) may perform cropping of a first page of the electronic document to obtain a portion of the electronic document associated with a header section of the electronic document, as described above in connection with reference number 110 of FIG. 1B. As an example, the header section may be an upper portion of the first page of the electronic document and may include information such as a title of the electronic document, an author of the electronic document, a form identifier for the electronic document, a control number associated with the electronic document, and/or a year or a date associated with the electronic document, among other examples.

As further shown in FIG. 5, process 500 may include performing optical character recognition on the portion of the electronic document to obtain first text data associated with the portion of the electronic document (block 530). For example, the validation system 320 (e.g., using processor 420 and/or memory 430) may perform optical character recognition on the portion of the electronic document to obtain first text data associated with the portion of the electronic document, as described above in connection with reference number 115 of FIG. 1C. As an example, if the electronic document is a driver's license, the first text data may include words such as "license," "state," "department of motor vehicles," or the like.

As further shown in FIG. 5, process 500 may include determining, based on a comparison of the first text data to a plurality of text indicators of document types, whether the first text data corresponds to any of the plurality of text indicators (block 540). For example, the validation system 320 (e.g., using processor 420 and/or memory 430) may determine, based on a comparison of the first text data to a plurality of text indicators of document types, whether the first text data corresponds to any of the plurality of text indicators, as described above in connection with reference number 120 of FIG. 1C. As an example, the text indicators of a pay stub document type may include text such as "pay," "employee," "salary," or the like. In some implementations, the first text data corresponding to a text indicator of a document type, indicates that a type of the electronic document is the document type.

As further shown in FIG. 5, process 500 may include performing, based on a determination that the first text data does not correspond to any of the plurality of text indicators, optical character recognition on an entirety of the electronic document to obtain second text data (block 550). For example, the validation system 320 (e.g., using processor 420 and/or memory 430) may perform, based on a determination that the first text data does not correspond to any of the plurality of text indicators, optical character recognition on an entirety of the electronic document to obtain second text data, as described above in connection with reference number 130 of FIG. 1E. As an example, the electronic document may be unidentified based on the first text data, and therefore second text data representing the entirety of the electronic document may be obtained.

As further shown in FIG. 5, process 500 may include determining, using a machine learning model, the type of the electronic document based on the second text data (block 560). For example, the validation system 320 (e.g., using processor 420 and/or memory 430) may determine, using a machine learning model, the type of the electronic document based on the second text data, as described above in connection with reference number 135 of FIG. 1E. As an example, the machine learning model may be configured to determine a document type classification of a given electronic document, and the document type classification may indicate a type of the electronic document.

As further shown in FIG. 5, process 500 may include determining whether the type of the electronic document, determined using the machine learning model, differs from an expected document (block 570). For example, the validation system 320 (e.g., using processor 420 and/or memory 430) may determine whether the type of the electronic document, determined using the machine learning model, differs from an expected document, as described above in connection with reference number 140 of FIG. 1E. As an example, if the expected document is a pay stub and the determined type of the electronic document is a driver's license, then the type of the electronic document may be determined to differ from the expected document.

As further shown in FIG. 5, process 500 may include transmitting, based on a determination that the type of the electronic document differs from the expected document, a notification, for presentation in the user interface, indicating that the electronic document is not the expected document (block 580). For example, the validation system 320 (e.g., using processor 420, memory 430, output component 450, and/or communication component 460) may transmit, based on a determination that the type of the electronic document differs from the expected document, a notification, for presentation in the user interface, indicating that the electronic document is not the expected document, as described above in connection with reference number 145 of FIG. 1F. As an example, the notification may be transmitted based on a determination that the user is active in the user interface, so that the notification may reach the user while the user is still actively engaged with the user interface and the user may immediately correct the error.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for electronic document validation, the system comprising:

one or more memories; and one or more processors, communicatively coupled to the one or more memories, configured to:

obtain an electronic document submitted via a user interface;

identify a height and a width of a first page of the electronic document;

determine a height and a width of a cropping box based on the height and the width of the first page of the electronic document, wherein the height of the cropping box is less than the height of the first page of the electronic document and the width of the cropping box is the same as the width of the first page of the electronic document, perform, in accordance with the cropping box and based on a side of the cropping box aligning with a side of the first page of the electronic document, cropping of the first page of the electronic document to obtain a portion of the electronic document associated with a header section of the electronic document;

perform optical character recognition on the portion of the electronic document to obtain first text data associated with the portion of the electronic document;

determine, based on a comparison of the first text data to a plurality of text indicators of document types, whether the first text data corresponds to any of the plurality of text indicators, wherein the first text data corresponding to a text indicator of a document type, indicates that a type of the electronic document is the document type;

perform, based on a determination that the first text data does not correspond to any of the plurality of text indicators, optical character recognition on an entirety of the electronic document to obtain second text data;

determine, using a machine learning model, the type of the electronic document based on the second text data;

determine whether the type of the electronic document, determined using the machine learning model, differs from an expected document type; and transmit, based on a determination that the type of the electronic document differs from the expected document type, a notification, for presentation in the user interface, indicating that the electronic document is not the expected document type.

2. The system of claim 1, wherein the one or more processors are further configured to:

monitor user activity in the user interface, wherein the one or more processors are configured to transmit the notification based on a determination, based on the user activity, that a user is active in the user interface.

3. The system of claim 1, wherein the machine learning model is configured to determine a document type classification of a given electronic document.

4. The system of claim 1, wherein the machine learning model is configured to determine a cluster of a given electronic document, the cluster indicating a type of the given electronic document.

5. The system of claim 1, wherein the one or more processors are further configured to:

perform semantic analysis on the first text data to identify an accuracy level of the optical character recognition, wherein the one or more processors, to determine whether the first text data corresponds to any of the plurality of text indicators, are configured to:

determine whether the first text data corresponds to any of the plurality of text indicators based on the accuracy level satisfying a threshold.

6. The system of claim 1, wherein the one or more processors are further configured to:

convert the first page of the electronic document to an image file prior to cropping of the first page of the electronic document.

7. The system of claim 1, wherein the side of the cropping box is a top of the cropping box, and wherein the side of the first page of the electronic document is a top of the first page of the electronic document.

8. The system of claim 7, wherein the height of the cropping box is no more than 25% of the height of the first page of the electronic document.

9. The system of claim 1, wherein the first text data indicates at least one of a title of the electronic document, a form identifier for the electronic document, or a control number for the electronic document.

10. A method of electronic document validation, comprising:

obtaining, by a device an electronic document submitted via a user interface;

identifying, by the device, a height and a width of a first page of the electronic document;

determining, by the device, a height and a width of a cropping box based on the height and the width of the first page of the electronic document, wherein the height of the cropping box is less than the height of the first page of the electronic document and the width of the cropping box is the same as the width of the first page of the electronic document;

performing, by the device, in accordance with the cropping box, and based on a side of the cropping box aligning with a side of the first page of the electronic document, cropping of the first page of the electronic document to obtain a portion of the electronic document;

obtaining, by the device, first text data associated with the portion of the electronic document;

determining, by the device, whether the first text data corresponds to any of a plurality of text indicators of document types;

obtaining, by the device and based on a determination that the first text data does not correspond to any of the plurality of text indicators, second text data associated with a greater portion of the electronic document that includes more than the first text data;

determining, by the device and using a machine learning model, a type of the electronic document based on the second text data;

determining, by the device, whether the type of the electronic document, determined using the machine learning model, differs from an expected document type; and transmitting, by the device and based on a determination that the type of the electronic document differs from the expected document type, a notification, for presentation in the user interface, indicating that the electronic document is not the expected document type.

11. The method of claim 10, wherein the notification is transmitted further based on detecting user activity in the user interface.

12. The method of claim 10, wherein the machine learning model is configured to determine a type of a given electronic document using natural language processing.

13. The method of claim 10, wherein the machine learning model is configured to determine a document type classification of a given electronic document.

14. The method of claim 10, wherein the machine learning model is configured to determine a cluster of a given electronic document, the cluster indicating a type of the given electronic document.

15. The method of claim 14, wherein obtaining the electronic document comprises:

obtaining a plurality of electronic documents that includes the electronic document, and wherein determining, using the machine learning model, the type of the electronic document comprises:

determining, using the machine learning model, one or more clusters to which the plurality of electronic documents belong; and determining, using an additional machine learning model, a document type classification of one electronic document in a cluster of the electronic document, wherein the type of the electronic document corresponds to the document type classification.

16. A non-transitory computer-readable medium storing a set of instructions for electronic document validation, the set of instructions comprising:

one or more instructions that, when executed by one or more processors of a device, cause the device to:

obtain an electronic document submitted via a user interface;

identify a height and a width of a first page of the electronic document;

determine a height and a width of a cropping box based on the height and the width of the first page of the electronic document, wherein the height of the cropping box is less than the height of the first page of the electronic document and the width of the cropping box is the same as the width of the first page of the electronic document;

perform, in accordance with the cropping box, and based on a side of the cropping box aligning with a side of the first page of the electronic document, cropping of the first page of the electronic document to obtain a portion of the electronic document;

obtain text data associated with the portion of the electronic document;

determine that the text data corresponds to a text indicator of a plurality of text indicators of document types, wherein the text data corresponding to the text indicator of a document type indicates that a type of the electronic document is the document type; and transmit, based on a determination that the type of the electronic document differs from an expected document type, a notification, for presentation in the user interface, indicating that the electronic document is not the expected document type.

17. The non-transitory computer-readable medium of claim 16, wherein the text data indicates at least one of a title of the electronic document, a form identifier for the electronic document, or a control number for the electronic document.

18. The non-transitory computer-readable medium of claim 16, wherein the one or more instructions, that cause the device to determine that the text data corresponds to the text indicator of the plurality of text indicators of document types, cause the device to:

determine, based on a comparison of the text data to the plurality of text indicators using string matching, approximate string matching, or regular expression matching, that the text data corresponds to the text indicator of the plurality of text indicators of document types.

19. The non-transitory computer-readable medium of claim 16, wherein the one or more instructions, when executed by the one or more processors, further cause the device to:

determine whether an attribute of the electronic document differs from the expected document type; and transmit, based on a determination that the attribute of the electronic document differs from the expected document type, a notification, for presentation in the user interface, indicating that the electronic document is not the expected document type.

20. The non-transitory computer-readable medium of claim 19, wherein the attribute is a time period associated with the electronic document.

* * * * *